United States Patent [19]

Ichikawa

[11] Patent Number: 5,301,043
[45] Date of Patent: Apr. 5, 1994

[54] IMAGE READING APPARATUS IN WHICH AN ORIGINAL IMAGE IS AUTOMATICALLY FED TO A TURNTABLE

[75] Inventor: Shin-ichi Ichikawa, Kanagawa, Japan
[73] Assignee: Fuji Photo Film Co., Ltd., Kanagawa, Japan
[21] Appl. No.: 34,211
[22] Filed: Mar. 19, 1993

Related U.S. Application Data

[63] Continuation of Ser. No. 595,132, Oct. 10, 1990, abandoned.

[30] Foreign Application Priority Data

Oct. 11, 1989 [JP] Japan ................... 1-264179
Oct. 11, 1989 [JP] Japan ................... 1-264181
Oct. 11, 1989 [JP] Japan ................... 1-264182
Oct. 18, 1989 [JP] Japan ................... 1-272264

[51] Int. Cl.⁵ .................................... H04N 1/04
[52] U.S. Cl. ........................ 358/498; 358/474
[58] Field of Search ................... 358/497–498, 358/474, 75, 80, 400–402

[56] References Cited

U.S. PATENT DOCUMENTS

| | | | |
|---|---|---|---|
| 4,268,872 | 5/1981 | Kokaji et al. | 358/401 |
| 4,616,926 | 10/1986 | DiPietro et al. | 355/45 |
| 4,673,989 | 6/1987 | Yamada et al. | 358/450 |
| 4,698,511 | 10/1987 | Sueda et al. | 250/560 |
| 4,734,781 | 3/1988 | Takahashi | 350/280 |
| 4,868,672 | 9/1989 | Hiroki et al. | 358/474 |
| 4,980,781 | 12/1990 | Yamamoto et al. | 358/474 |
| 5,062,058 | 10/1991 | Morikawa | 358/75 |
| 5,073,829 | 12/1991 | Katsuta et al. | 358/498 |

FOREIGN PATENT DOCUMENTS 0196914 10/1986 European Pat. Off.
57-148460 9/1982 Japan.

Primary Examiner—Stephen Brinich
Attorney, Agent, or Firm—Sughrue, Mion, Zinn, Macpeak & Seas

[57] ABSTRACT

An image reading apparatus includes an original table for supporting an original cassette which contains an original to be read, and an auxiliary scanning mechanism for feeding the original cassette, with the original table, in an auxiliary scanning direction substantially normal to a main scanning direction of an illuminating light source. The image reading apparatus also has a rotating mechanism mounted on the original table and having a turntable for holding the original cassette, a positioning mechanism for positioning and fixing the original cassette with respect to the turntable, and a trimming mechanism for moving the turntable in the main scanning direction of the illuminating light source, the main scanning direction being a trimming direction in which the turntable can be trimmed. The original cassette is automatically fed from a cassette insertion slot to the turntable by a feed mechanism. The image reading apparatus also has an identifying mechanism for optically identifying the type and number of thee original cassette.

15 Claims, 17 Drawing Sheets

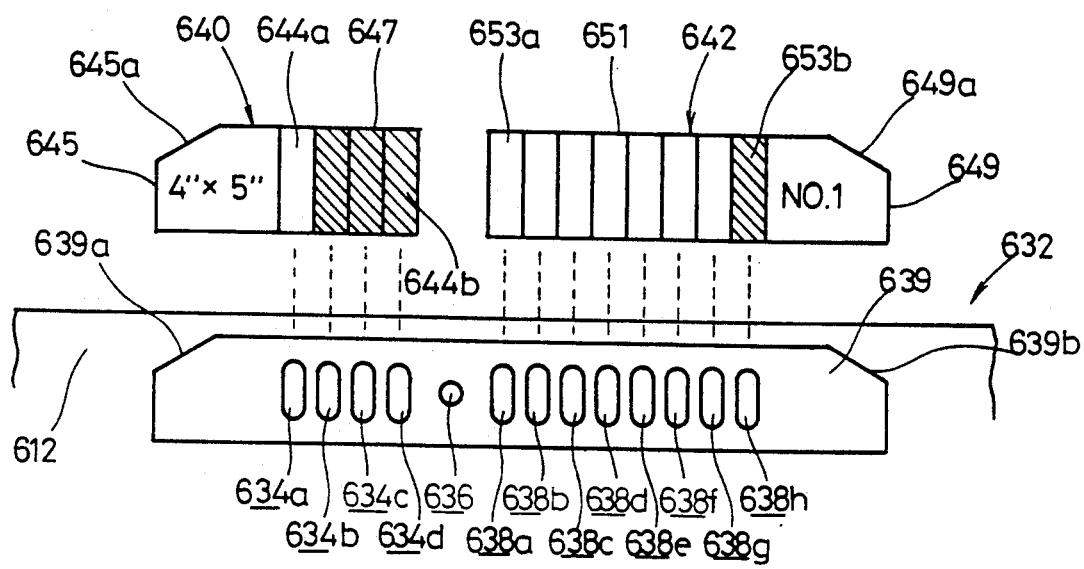
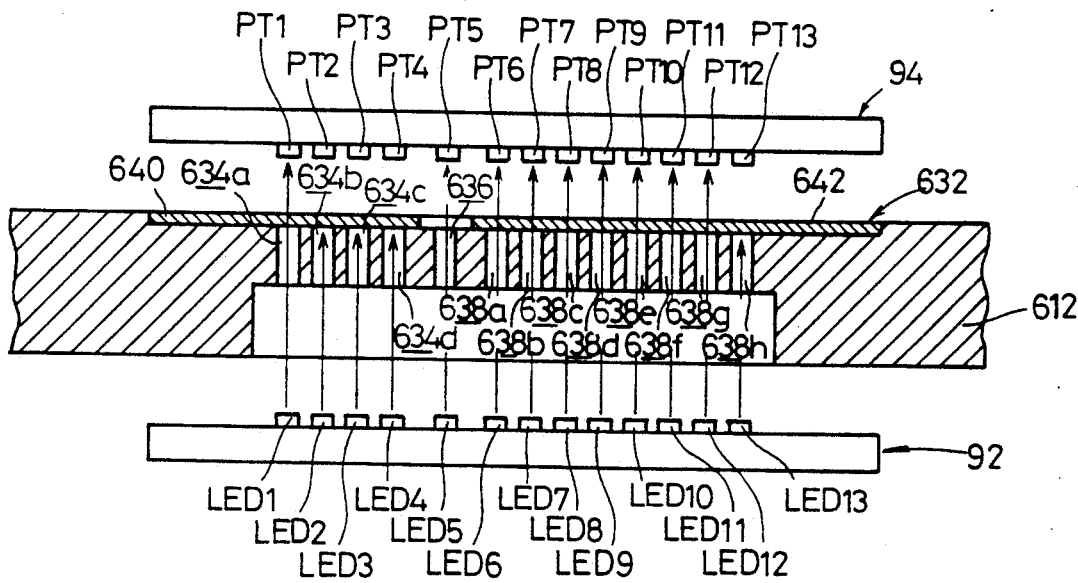

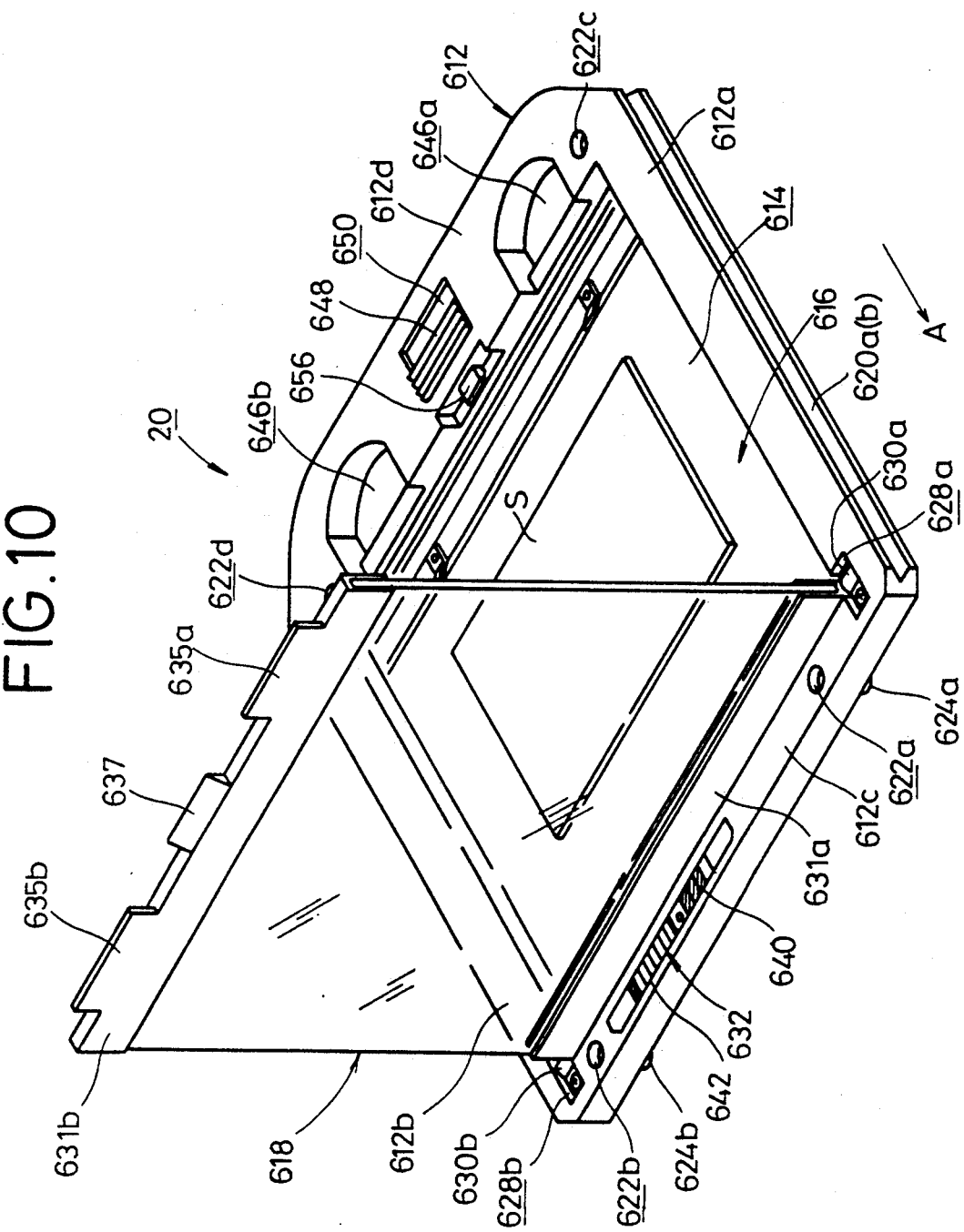

IMAGE READING APPARATUS IN WHICH AN ORIGINAL IMAGE IS AUTOMATICALLY FED TO A TURNTABLE

This is a continuation of application Ser. No. 07/595,132 filed Oct. 10, 1990, now abandoned.

BACKGROUND OF THE INVENTION

1. Field of the Invention

The present invention relates to an image reading apparatus for automatically feeding an original cassette containing an original to be read, with respect to a subject holder, thereafter rotating and trimming the original cassette, as required, and feeding the original cassette in an auxiliary scanning direction while illuminating light is applied to the original in a main scanning direction thereby to read the original.

2. Prior Art

Image scanning reading and reproducing systems are widely used in the printing and platemaking industries for electrically processing image information of originals or subjects to produce original film plates with a view to simplifying the entire process and improving the quality of printed images.

The image scanning reading and reproducing systems are basically constructed of an image reading apparatus and an image reproducing apparatus. In the image reading apparatus, an original or subject whose image information is to be read is contained in an original cassette, and the original cassette is fed in an auxiliary scanning direction by a subject holder. While the original cassette is being fed in the auxiliary scanning direction, an illuminating light source is energized to apply illuminating light to the original in a main scanning direction substantially normal to the auxiliary scanning direction. Therefore, the image information of the original is two-dimensionally scanned by the illuminating light.

The subject holder is often combined with a mechanism for rotating the original cassette with respect to the subject holder in order to adjust the halftone dot angle or gravure angle of the original, and a mechanism for moving the original cassette in a direction normal to the auxiliary scanning direction of the subject holder in order to trim the original mechanically.

Heretofore, the subject holder has a table movable in trimming directions toward and away from the subject holder and a turntable mounted centrally on the table. The original cassette needs to be manually installed on and detached from the turntable by the operator. Therefore, the procedure for mounting and removing original cassette on and from the turntable is tedious and inefficient, and the entire image reading process cannot be automatized.

If the original cassette were to be automatically fed to the turntable by a feed mechanism, the original cassette would have to be positioned highly accurately and rigidly with respect to the turntable because the original cassette would tend to be positionally displaced when the turntable rotates. The positionally displaced original cassette would not allow the original contained therein to be read accurately.

If the original cassette were to be fed to the turntable by a feed mechanism, the feed mechanism would interfere with the turntable when the turntable is rotated, trimmed, and moved in the auxiliary scanning direction, together with the original cassette, with the result that it would not be able to displace the turntable smoothly in any desired direction. Because of these difficulties, there has not yet been proposed any feed mechanism for automatically feeding the original cassette to the turntable.

In the image reading apparatus, it is sometimes desirable to automatically identify the type of an original or subject contained in the original cassette or the individual identification number of the original cassette. One proposed arrangement for such automatic identification includes a reflective code comprising white and black bars which encode the type of an original and the number of the original cassette, and the reflective code is applied to the original cassette, so that the code will be optically detected by a reflective light sensor.

Reflective codes are fixedly applied to respective original cassettes. Therefore, the original cassettes are dedicated respectively to the types of originals. Accordingly, as many original cassettes as there are the types of originals are required. Furthermore, it is quite difficult for an inexpensive reflective light sensor to be able to detect many types of codes.

SUMMARY OF THE INVENTION

It is a major object of the present invention to provide an image reading apparatus in which a cassette storing an original to be read is automatically fed to a turntable on an original table or subject holder, so that an automatic and efficient reading process can be achieved.

Another object of the present invention is to provide an image reading apparatus comprising an original cassette which stores an original to be read, an original table for supporting the original cassette, an auxiliary scanning mechanism for feeding the original cassette, with the original table, in an auxiliary scanning direction substantially normal to a main scanning direction of an illuminating light source, a rotating mechanism mounted on the original table and having a turntable for holding the original cassette, a positioning mechanism for positioning and fixing the original cassette with respect to the turntable, a trimming mechanism for moving the turntable in the main scanning direction of the illuminating light source, the main scanning direction being a trimming direction in which the turntable can be trimmed, and a feed mechanism for automatically feeding the original cassette from a cassette insertion slot to the turntable.

Still another object of the present invention is to provide the image reading apparatus wherein the rotating mechanism comprises a rotatable drive gear, a ring gear mounted on the turntable and held in mesh with the drive gear, a groove defined in an outer circumferential surface of the turntable, and a support roller held in contact with the groove and supporting the turntable.

Yet another object of the present invention is to provide the image reading apparatus wherein the groove of the turntable has a V-shaped cross section, the support roller has an outer circumferential surface of an arcuate cross section and is held in point-to-point contact with the groove of V-shaped cross section.

Yet still another object of the present invention is to provide the image reading apparatus wherein the trimming mechanism comprises a trimming table, the turntable being supported on the trimming table, and a ball screw for moving the trimming table in the trimming direction.

A further object of the present invention is to provide the image reading apparatus wherein the original cassette has a groove of a V-shaped cross section defined in a side of the original cassette, the feed mechanism comprising a feed roller rollingly engageable with the original cassette, for feeding the original cassette, and a guide roller having an outer circumferential surface of an arcuate cross section and held in point-to-point contact with the groove, for supporting the original cassette.

A still further object of the present invention is to provide the image reading apparatus further including an identifying mechanism having a light-emitting device and a light-detecting device, the original cassette comprising a frame surrounding the original, the frame having a plurality of holes extending from one surface to another surface of the frame, for allowing light emitted from the light-emitting device to be applied to the light-detecting device, the original cassette further comprising hole closing means for making selected ones of the holes intransmissive of light.

A yet further object of the present invention is to provide the image reading apparatus wherein the hole closing means comprises a light-intransmissive portion of a light-transmissive label, which corresponds to the selected holes.

It is also an object of the present invention to provide an image reading apparatus comprising an original table for supporting an original cassette storing an original to be read, a rotatable turntable angularly adjustable to a desired reading angle with respect to the original table, and a positioning mechanism for positioning and holding the original cassette on the turntable, the positioning mechanism comprising lock means for locking the turntable to position and hold the original cassette in a direction substantially normal to an optical axis of illuminating light to be applied to the original, an actuator for actuating the lock means to release the original cassette when the turntable is placed in an angular position to install and remove the original cassette on and from the turntable, and guide means for guiding the original cassette with respect to the turntable and positioning and holding the original cassette at least along the optical axis.

Another object of the present invention is to provide the image reading apparatus wherein the lock means comprises a stopper for engaging one end of the original cassette, and an engaging plate swingably supported by a spring and engageable with an opposite end of the original cassette.

Still another object of the present invention is to provide the image reading apparatus wherein the actuator comprises a rotatable cam plate, and a slide member displaceable into engagement with the lock means when pushed by the cam plate.

Yet another object of the present invention is to provide the image reading apparatus wherein the guide means comprises guide rollers for rollingly contacting opposite sides of the original cassette along a direction in which the original cassette is fed, and a resilient member for resiliently pulling the original cassette along the optical axis through the guide rollers.

It is further an object of the present invention to provide an image reading apparatus comprising an original table which can be moved in an auxiliary scanning direction substantially normal to a main scanning direction of an illuminating light source, or rotated to adjust an angle at which an original is to be read, or trimmed substantially in the main scanning direction, and a cassette feeding mechanism for feeding an original which stores the original toward the original table, the cassette feeding mechanism comprising a plurality of feed rollers rotatable in rolling contact with the original cassette, for feeding the original cassette, and displacing means for displacing the feed rollers out of rolling engagement with the original cassette when the original cassette is placed at least in a predetermined position on the original table.

A still further object of the present invention is to provide the image reading apparatus wherein the displacing means comprises a slide plate, the feed rollers being supported on the slide plate, a resilient member for pulling the slide plate toward the original cassette, and a rotatable cam member engaging the slide plate.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a view of an identifying mechanism of the image reading apparatus;

FIG. 10 is a perspective view of an original cassette of the image reading apparatus;

FIG. 14 is a view of a cassette identifying device of the original cassette;

DETAILED DESCRIPTION OF THE PREFERRED EMBODIMENTS

Figure 1:
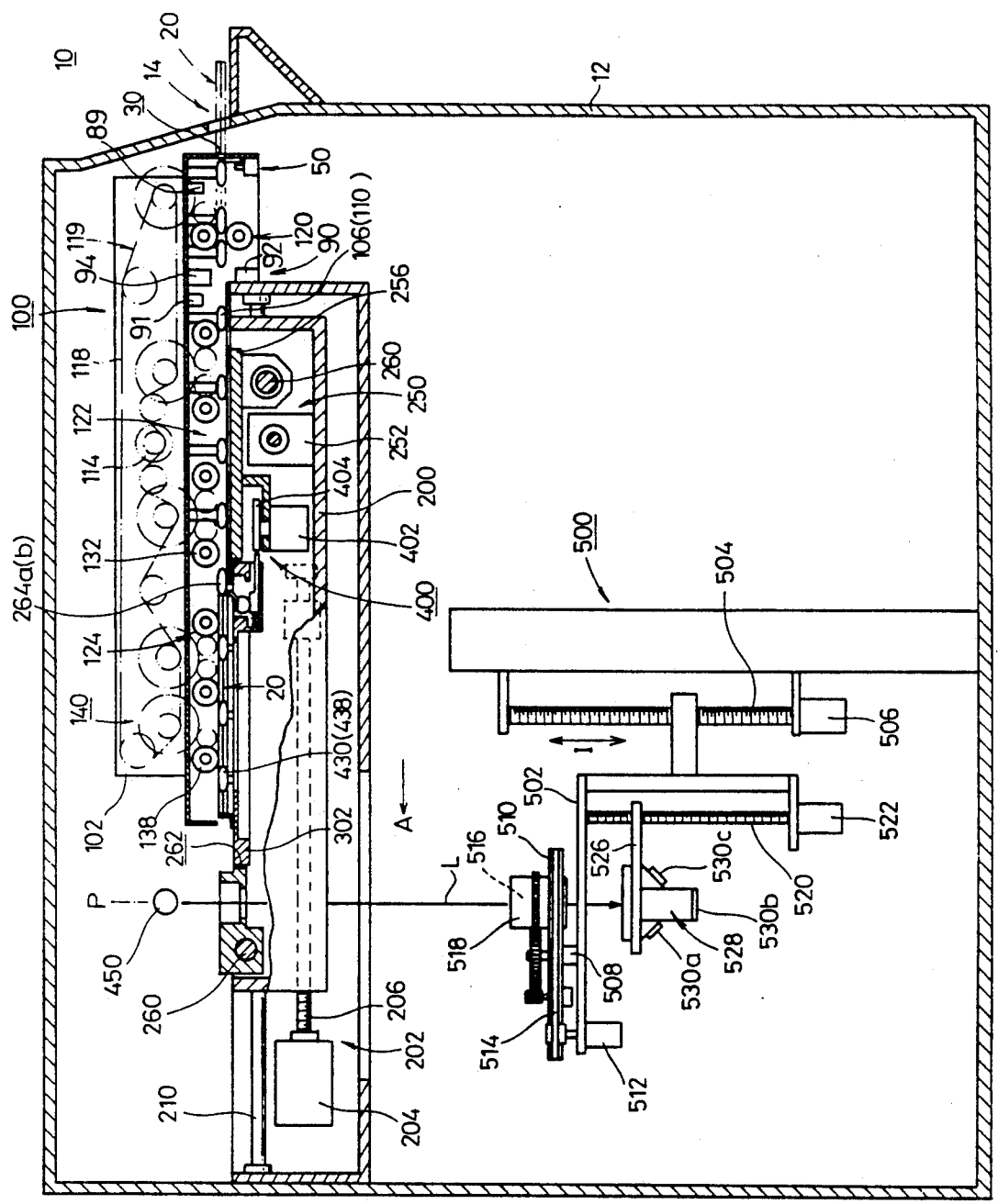
FIG. 1 is a cross-sectional view of an image reading apparatus according to the present invention.

FIG. 1 shows an image reading apparatus, generally denoted at 10, according to the present invention. The image recording apparatus 10 has a housing 12 with a cassette loading/unloading region 14 at an end of an upper portion thereof. The original cassette 20 can be introduced into and removed from the housing 12 through the cassette loading/unloading region 14.

A cassette insertion slot 30 is defined near the cassette loading/unloading region 14. The cassette insertion slot 30 is of a desired shape corresponding to the configuration of the cassette 20, so that the cassette 20 is prevented from being inserted when oriented in a different direction. An engaging mechanism 50 is disposed near the cassette insertion sot 30.

Figure 2:
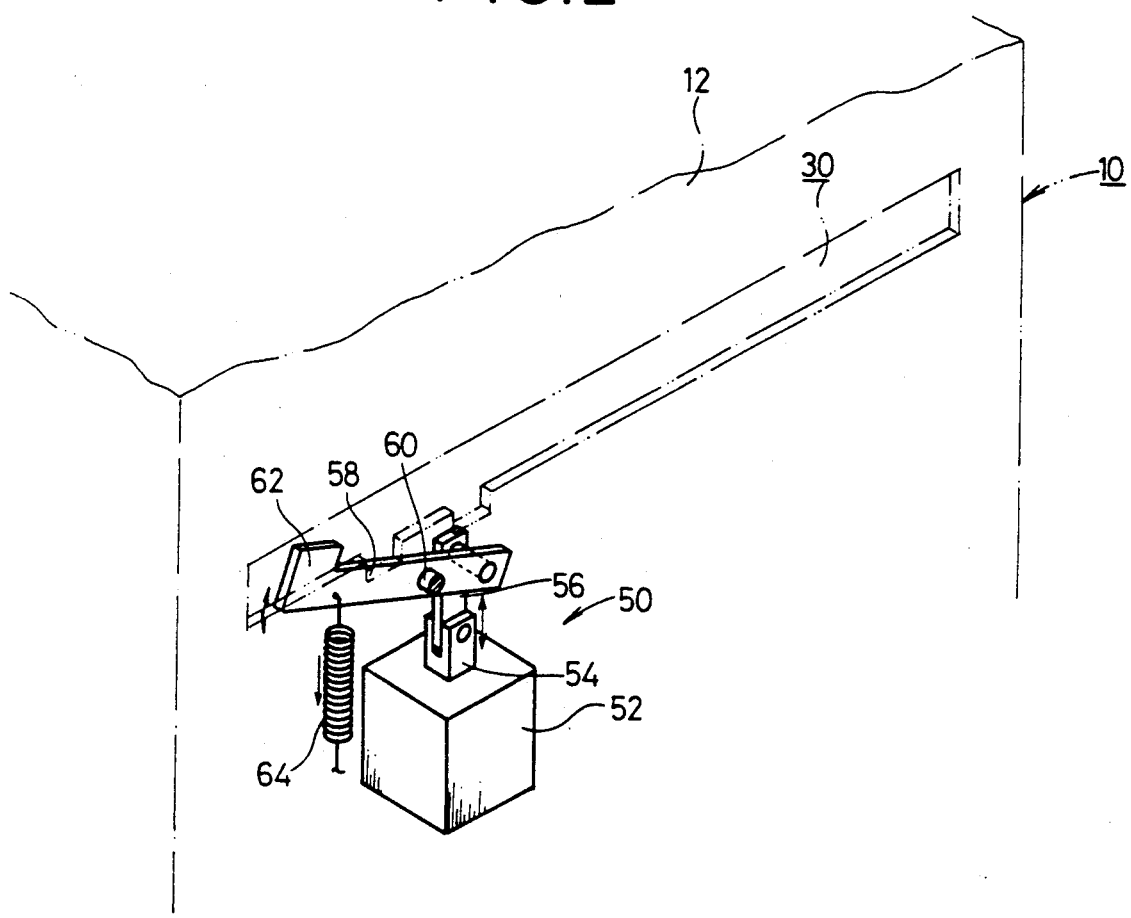
FIG. 2 is a perspective view of an engaging mechanism of the image reading apparatus.

As shown in FIG. 2, the engaging mechanism 50 has an actuator such as a linear solenoid 52. An engaging member 58 has one end coupled through a link 56 to a rod 54 extending from the linear solenoid 52. The engaging member 58 is swingably supported at its substantially central portion on a shaft 60. The other end of the engaging member 58 has a projecting portion 62 movable into the cassette insertion slot 30, and a tension spring 64 engages the engaging member 58 on a side thereof opposite to the projecting portion 62. The engaging member 58 is angularly movable by the linear solenoid 52 and the tension spring 64 to move the projecting portion 62 angularly between a position in which the projecting portion 62 enters the cassette insertion slot 30 and a position in which it is displaced out of the cassette insertion slot 30.

As shown in FIG. 1, there are disposed, near the cassette insertion slot 30, a cassette sensor 89 for detecting an original cassette inserted through the cassette insertion slot 30, an identifying mechanism 90 for identifying the type of an original or subject S contained in the original cassette 20, and a sensor 91 for actuating the identifying mechanism 90.

As shown in FIG. 9, the identifying mechanism 90 comprises a light-emitting device 92 and a light-detecting device 94 which are disposed in confronting relation to each other across the original cassette 10 which is fed. The light-emitting device 92 comprises an array of light-emitting diodes LED1 through LED13 facing a cassette identifying device (described later on), for emitting light toward the light-detecting device 94. The light-detecting device 94 comprises an array of phototransistors PT1 through PT13 for detecting the light from the light-emitting diodes LED1 through LED13.

Figure 3:
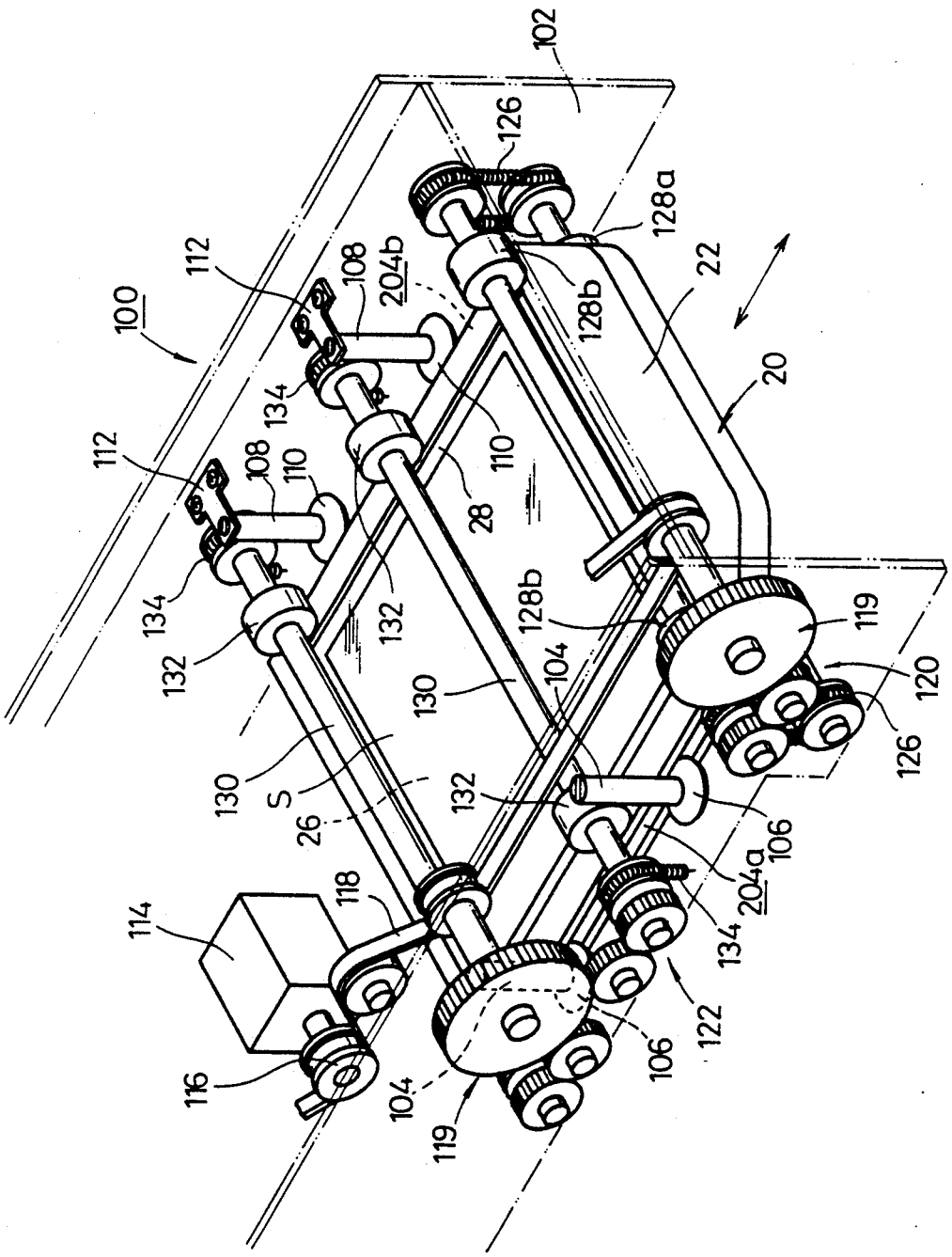
FIG. 3 is a perspective view of a feed mechanism of the image reading apparatus.

As shown in FIG. 1, a feed mechanism 100 has a end disposed near the identifying mechanism 90. The other end of the feed mechanism 100 extends to a position above a turntable (described later). As shown in FIG. 3, the feed mechanism 100 includes a frame 102, and a plurality of upstanding rods 104 arrayed along the direction in which the cassette will be fed are fixed to one end of the frame 102. Guide rollers 106 are supported respectively on the rods 104. The guide rollers 106 have outer peripheral surfaces of an arcuate cross-sectional shape which are held in point-to-point contact with the inner wall surface which defines a V-shaped groove (described later) of the cassette 20. Guide rollers 11 for engaging in another V-shaped grooves (described late) of the cassette 20 are supported on the other end of the frame 102 by a plurality of rods 108 which are arrayed in the feeding direction in which the cassette will be fed. The rods 108 are supported on the frame 102 by leaf springs 112. Therefore, the guide rollers 110 are normally tilted toward the guide rollers 106 under the resiliency of the leaf springs 112.

A rotative drive source 114 is fixedly mounted on the frame 102, and a timing belt 118 is trained around a pulley 116 mounted on the drive shaft of the rotative drive source 114. The timing belt 118 rotates a roller pair 120, a first feed roller group 122, and a second feed roller group 124 through a rotative power transmitting means 119 including pulleys on which the timing belt 118 is trained and a gear train. The roller pair 120 comprises pairs of rollers 128a, 128b which are held in contact with each other by springs 126, the rollers 128b being movable toward and away from the rollers 128a.

The first feed roller group 122 has a plurality of rotatable shafts 130 which are rotatable by the rotative power transmitting means 119. A pair of spaced feed rollers 132 is mounted on each of the rotatable shafts 130, for engaging a feed surface (described later) of the cassette 20. The feed rollers 132 are normally urged downwardly under the tension of springs 134 on the rotatable shafts 130.

Figure 4:
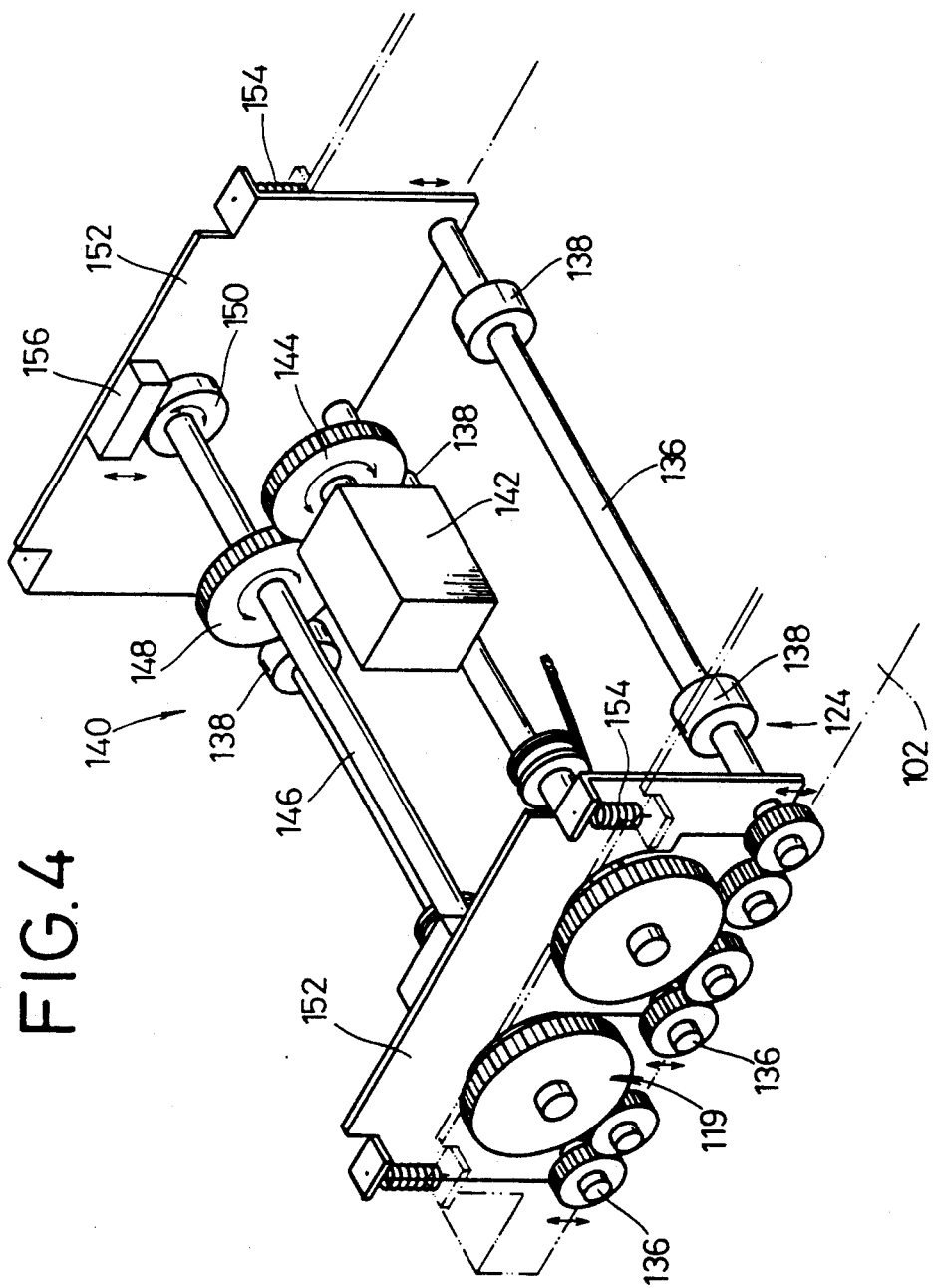
FIG. 4 is a perspective view of a displacing mechanism of the image reading apparatus.

As shown in FIG. 4, the second feed roller group 124 includes a plurality of rotatable shafts 136 engaging the rotative power transmitting means 119, and a pair of feed rollers 138 mounted on each of the rotatable shafts 136. The feed rollers 138 are vertically movable by a displacing mechanism 140. The displacing mechanism 140 includes a rotative drive source 142 fixed to the frame 102 which has a drive shaft with a gear 144 mounted thereon. The gear 144 is held in mesh with a gear 148 mounted on a drive rod 146. The drive rod 146 extends in a direction normal to the feeding direction, and is rotatably supported by the frame 102, with cam members 150 mounted on opposite ends of the drive rod 146. Slide plates 152 are disposed near the cam members 150. The slide plates 152 support the rotatable shafts 136 of the second feed roller group 124, and are normally urged downwardly under the tension of coil springs 154 coupled between the frame 102 and the slide plates 152. Blocks 156 which are engageable with the respective cam members 150 are fixed to the upper ends of the slide plates 152.

Figure 5:
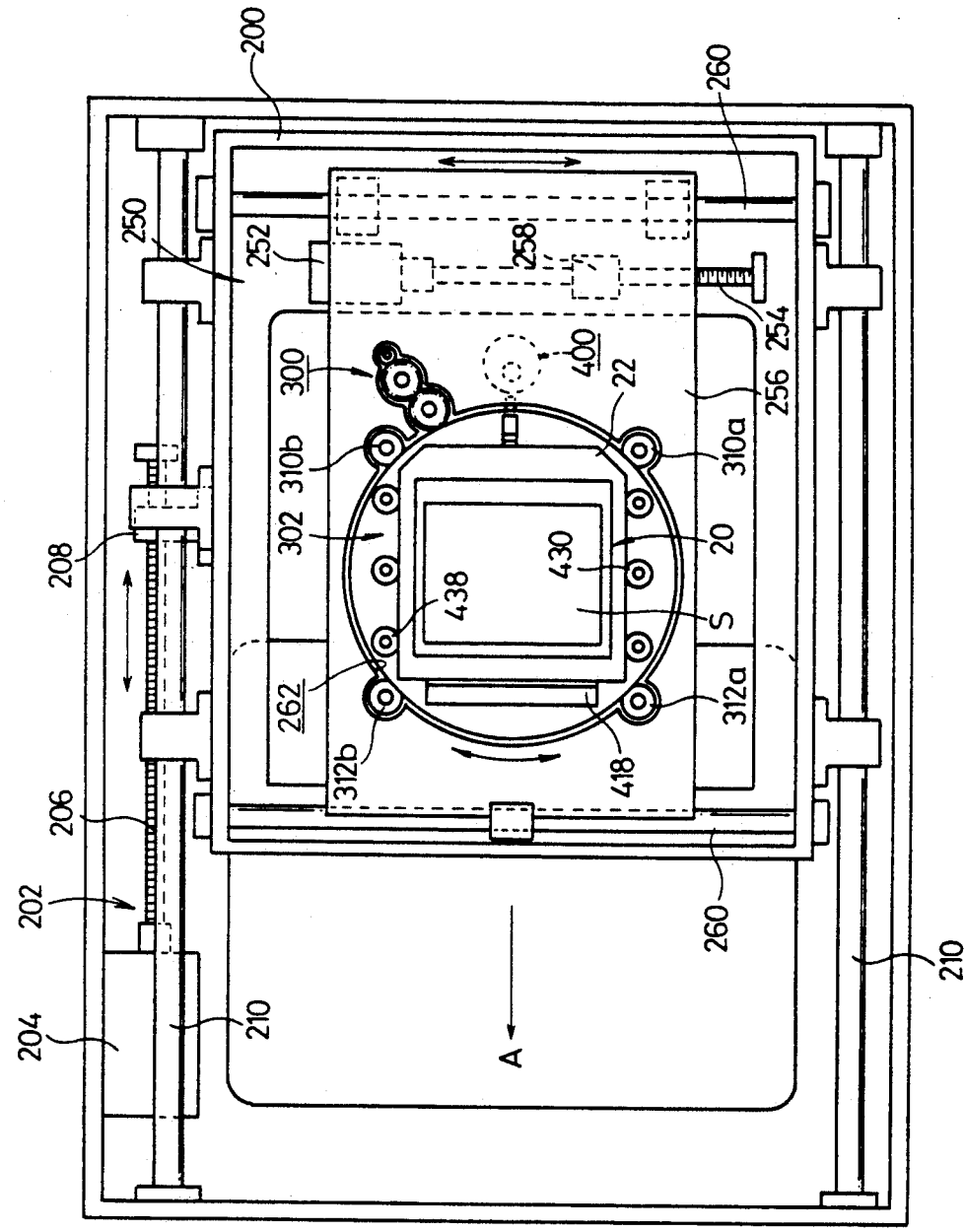
FIG. 5 is a plan view of an original table or subject holder of the image reading apparatus.

An original table or subject holder 200 which is movable back and force in an auxiliary scanning direction (indicated by the arrow A) by an auxiliary scanning mechanism 202 is positioned below the first and second feed roller groups 122, 124 of the feed mechanism 100. As shown in FIGS. 1 and 5, the auxiliary scanning mechanism 202 includes a rotative drive source 204 to which there is coupled a ball screw 206 that is fitted in a nut 208 fixed to one side of the original table 200. The opposite sides of the original table 200 are held by guide bars 210.

The original table 200 has a trimming mechanism 250 (see FIG. 5) for moving the cassette 20 back and forth in a trimming direction, i.e., a direction normal to the auxiliary scanning direction (indicated by the arrow A). The trimming mechanism 250 has a rotative drive source 252 mounted on the original table 200, and one end of a ball screw 254 is coupled to the rotative drive source 252. The ball screw 254 extends in the trimming direction, and is fitted in a nut 258 mounted on a trimming table 256, with the other end of the ball screw 254 being supported by the original table 200. A pair of parallel guide bars 260 extending in the trimming direction is fixedly mounted on the original table 200, and the trimming table 256 is supported on the guide bars 260.

The trimming table 256 has an opening 262 of a relatively large diameter. Guide rollers 264a, 264b (see FIG. 1) are supported near the opening 262 in alignment with the guide rollers 106, 110 of the feed mechanism 100. The trimming table 256 supports thereon a rotating mechanism 300 for rotating the cassette 20 through a predetermined angle, and a positioning mechanism 400 for positioning and holding the cassette 20 on a turntable 302 of the rotating mechanism 300.

Figure 6:
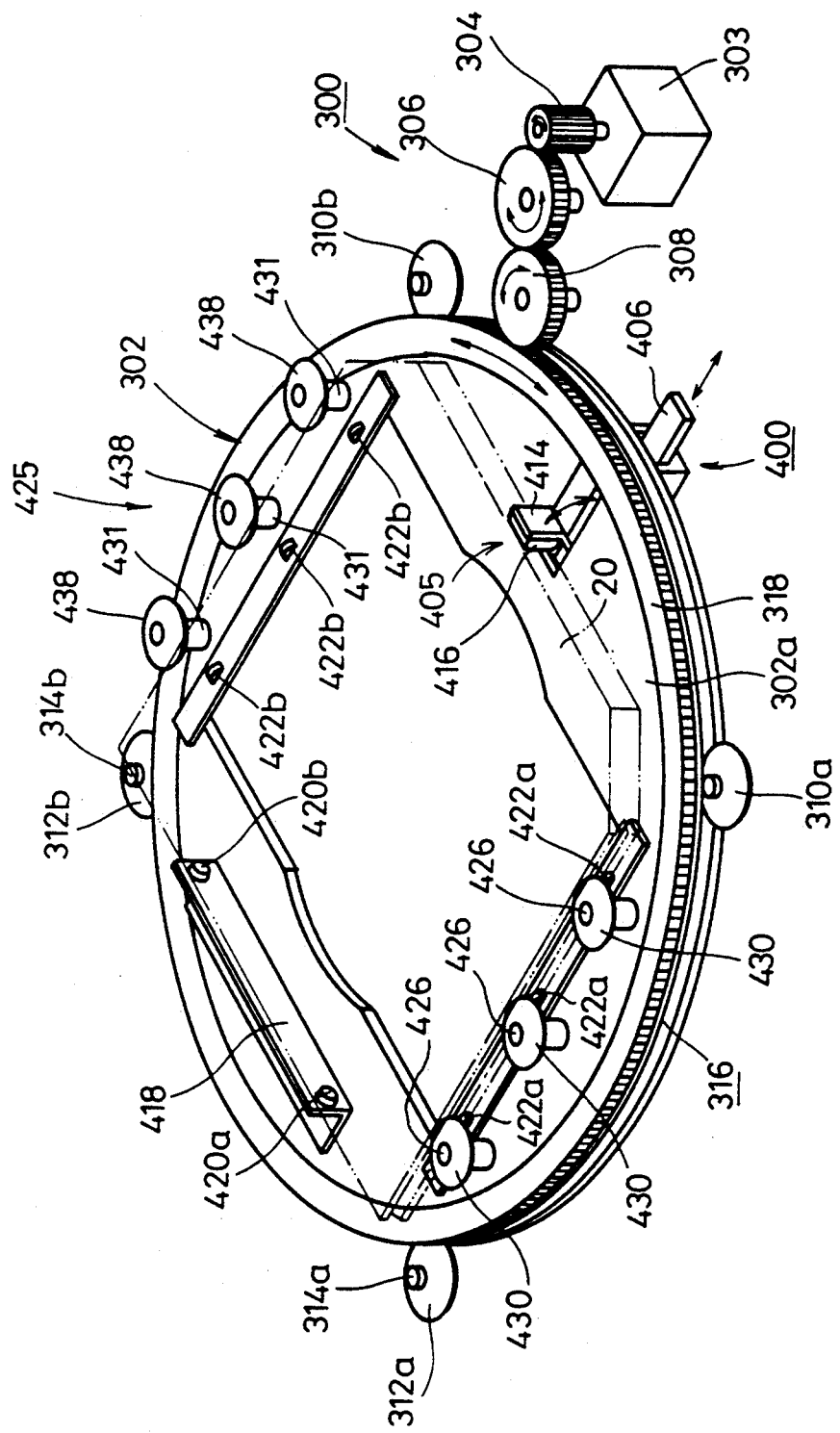
FIG. 6 is a perspective view of a rotating mechanism of the image reading apparatus.

As shown in FIG. 6, a rotative drive source 303 of the rotating mechanism 300 is supported on the lower surface of the trimming table 256, and a gear 308 is held in mesh with a gear 306 mounted on the drive shaft of the rotative drive source 303. The gear 306 is in mesh with a gear 308 which is in turn held in mesh with the turntable 302 which is supported on the trimming table 256. Fixed support rollers 310a, 310b and eccentric support rollers 312a, 312b are disposed on the trimming table 256 outside of the opening 262, these support rollers being angularly spaced by 90°. The support rollers 312a, 312b are supported on eccentric shafts 314a, 314b, so that the support rollers 312a, 312b are positionally displaced in response to rotation of the eccentric shafts 314a, 314b. The outer side surfaces of the support rollers 310a, 310b and 312a, 312b are of an arcuate cross-sectional shape, and the outer peripheral surface of the turntable 302 which is supported by these support rollers 310a, 310b and 312a, 312b has a V-shaped groove 316 defined therein. A ring gear 318 is fixed to the upper end of the outer peripheral surface of the turntable 302, and is held in mesh with the gear 308.

The positioning mechanism 400 includes an actuator such as a rotative drive source 402 fixed to the lower surface of the trimming table 256. The rotative drive source 402 has a drive shaft on which a cam plate 404 is mounted (see FIGS. 1 and 7). A lock means 405 disposed in an angular position to load and unload the cassette 20 and positioned for engaging the cam plate 404 is disposed on the turntable 302. The lock means 405 has a slide member 406, and a rack 408 is integrally formed with the slide member 406. A coil spring 410 engages an end of the slide member 406 for normally urging the slide member 406 toward the cam member 404.

The rack 408 is held in mesh with a pinion 412 which engages one end of an engaging plate 414. The engaging plate 414 is bent in its intermediate portion, and supports a resilient member 416 on the other end thereof. Therefore, when no external force is applied to the slide member 406, the engaging plate 414 is swung vertically upwardly under the resiliency of the coil spring 410, and an end face of the cassette 20 is pushed by the resilient member 416. When the cam plate 404 engages the slide member 406, the engaging plate 414 is swung in a horizontal direction to retract the resilient member 416 into the turntable 302.

Figure 8:
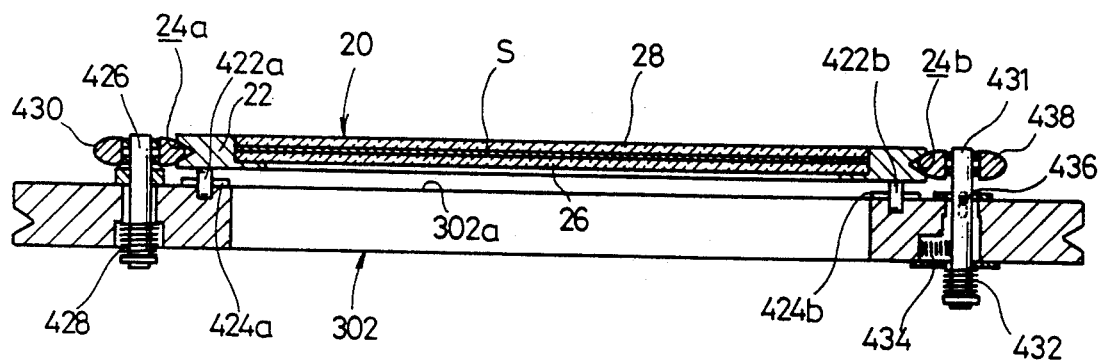
FIG. 8 is a vertical cross-sectional view of a turntable of the image reading apparatus.

As illustrated in FIG. 6, a stopper 418 is fixedly mounted on the turntable 302 in confronting relation to the elastic member 416, and resilient members 420a, 420b for engaging an end of the cassette 20 are mounted on an end face of the stopper 418. Between the engaging plate 414 and the stopper 418, there are disposed on the turntable 302 a plurality of rotors 422a, 422b for engaging the bottom surfaces of the opposite sides of the frame 22 of the cassette 20. The rotors 422a, 422b are supported by fixed shafts 424a, 424b placed directly on an upper surface 302a of the turntable 302 for accurately keeping the vertical position of the cassette 20 with respect to the turntable 302 (see FIG. 8).

A guide means 425 for positioning the original cassette 20 in the direction of an optical axis (described later) is disposed on the turntable 302. The guide means 425 comprises vertical rods 426 supported on the turntable 302 outwardly of the rotors 422a. The rods 426 are vertically movable under the resiliency of coil springs 428, with guide rollers 430 supported on the upper ends of the rods 426. Vertical rods 431 are also supported on the turntable 302 outwardly of the rotors 422b. The rods 431 are vertically movable under the resiliency of coil springs 432, and swingable about pins 436 under the resiliency of the coil springs 434, with guide rollers 438 supported on the upper ends of the rods 431.

As shown in FIG. 1, the housing 12 accommodates therein a light source 450 of a transmissive illuminating mechanism, the light source 450 extending in a main scanning direction substantially perpendicular to the direction indicated by the arrow A. Below the light source 450, there is disposed a image reading unit 500 which photoelectrically reads illuminating light L emitted from the light source 450.

The image reading unit 500 includes a bracket 502 which engages a ball screw 504 extending along the optical axis (in the direction indicated by the arrow I). The bracket 502 is movable back and forth along the optical axis by a rotative drive source 506 coupled to the ball screw 504. A turntable 510 is supported on the bracket 502 by a support shaft 508. A belt 514 engaging a rotative drive source 512 fixedly mounted on the bracket 502 is trained around the turntable 510. A plurality of focusing lenses 16 housed in a holder 518 are disposed in equidistant relation on the turntable 510.

A ball screw 520 extending along the optical axis is supported on the bracket 502 parallel to the ball screw 504. A rotative drive source 522 is coupled to an end of the ball screw 520, and a movable table 526 engages the ball screw 520. A holder 528 is attached to the movable table 526 and supports thereon a first CCD 530a, a second CCD 530b, and a third CCD 530c to which the illuminating light which is divided by a prism (not shown) is applied. The first through third CCDs 530a through 530c photoelectrically read color image information carried by the original S as image information corresponding to the colors of R, G, B.

Figure 11:
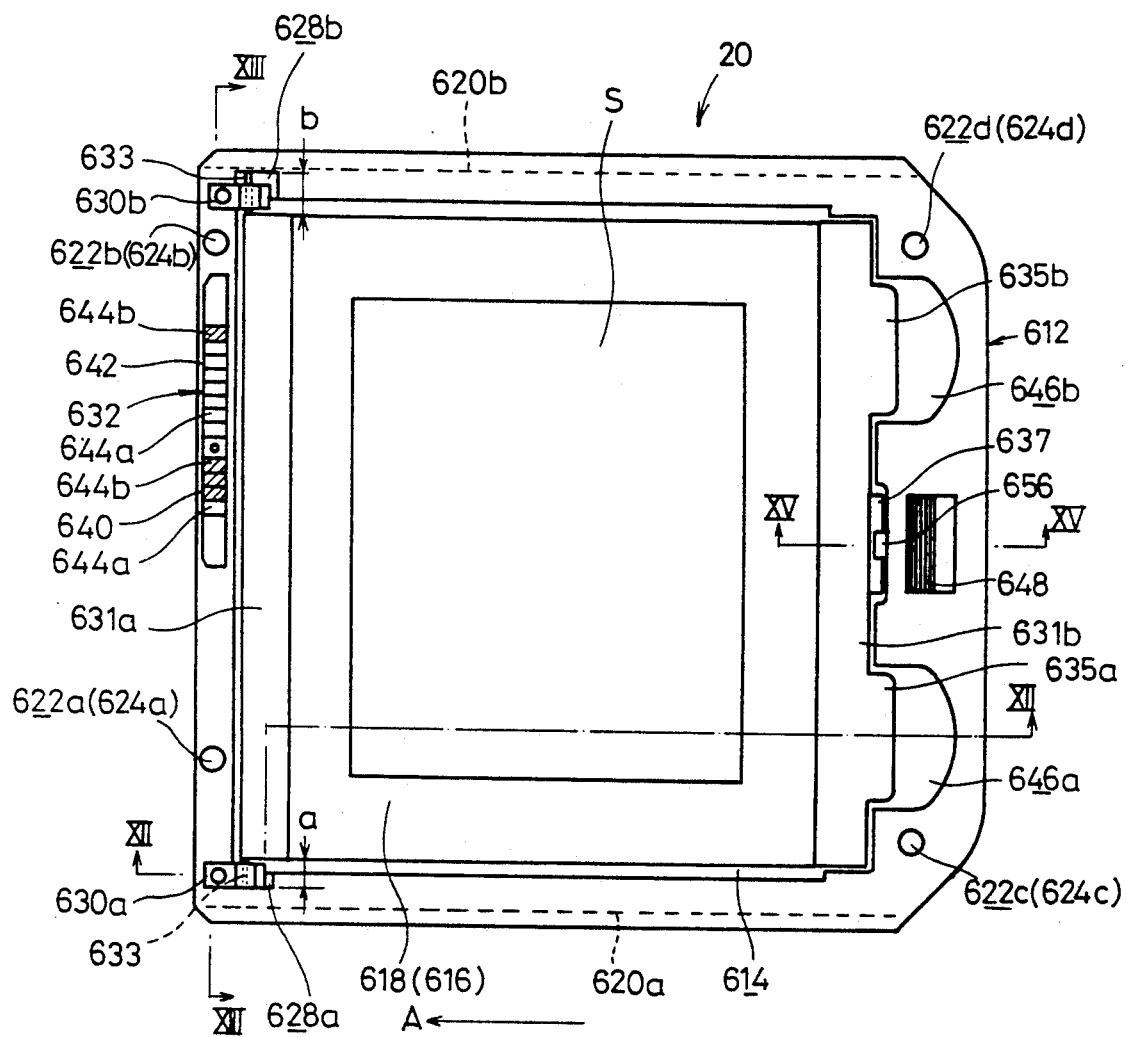
FIG. 11 is a plan view of the original cassette.

In FIGS. 10 and 11, the original cassette 20 comprises a frame 612 of a substantially square shape, a support glass panel 616 mounted in a rectangular opening 614 defined centrally in the frame 612, and a cover glass panel 618. An original or subject S to be read is held between a support glass panel 616 and the cover glass panel 618.

The frame 612 of the original cassette 20 has V-shaped grooves 620a, 620b defined in opposite sides thereof and extending in the direction indicated by the arrow A.

Figure 12:
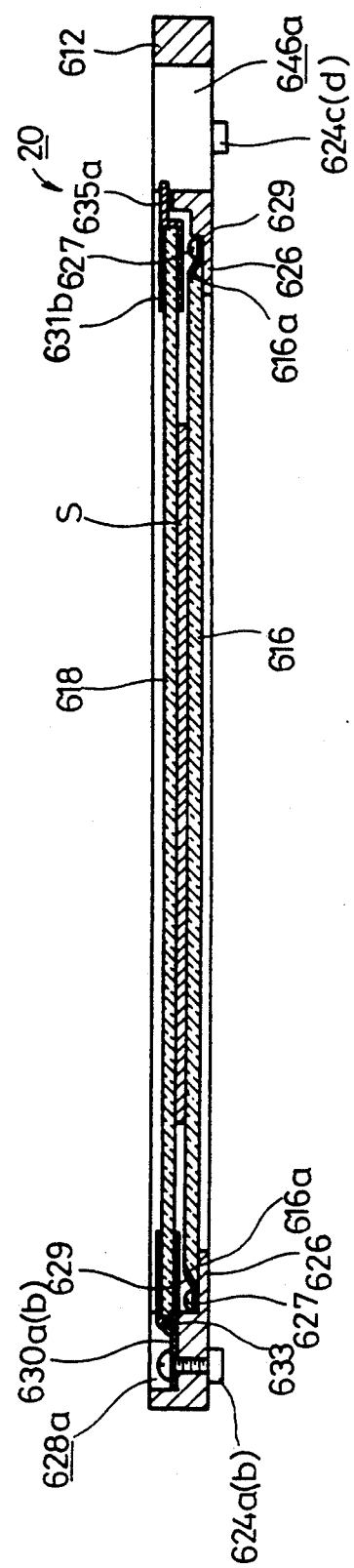
FIG. 12 is a cross-sectional view taken along line XII—XII of FIG. 11.

The upper surface of the frame 612 includes feed surface areas 612a, 612b extending along the direction by the arrow A and surface areas 612c, 612d extending perpendicularly to the feed surface areas 612a, 612b. The surface areas 612c, 612d have circular recesses 622a through 622d defined therein at certain locations. The lower surface of the frame 612 has circular projections 624a through 624d aligned respectively with the recesses 622a through 622d as shown in FIG. 12 (which is a cross-sectional view taken along line XII—XII of FIG. 11) and FIG. 13 (which is a cross-sectional view taken along line XIII—XIII of FIG. 11). The recess 622a and the projection 624a are positioned closer to the feed surface area 612b than the recess 622c and the projection 624c, whereas the recesses 622b, 622d and the projections 624b, 624d are disposed on a line along the direction indicated by the arrow A.

As shown in FIG. 12, the peripheral edge of the opening 614 has steps 626 along its lower surface for supporting the lower surface of the support glass panel 616. The support glass panel 616 has tapered upper peripheral surfaces 616a against which there are held presser plates 629 that are attached to the steps 626 by screws 627. The support glass panel 616 is held in the frame 612 in this manner.

The peripheral edge of the opening 614 has, on its upper surface, rectangular grooves 628a, 628b where the feed surface areas 612a, 612b and the surface 612c are joined, the grooves 628a, 628b extending from side edges of the cover glass panels 618 in a direction normal to the direction indicated by the arrow A, and having widths a, b, respectively (a≠b). Leaf springs 630a, 630b having a cross-sectional shape shown in FIG. 12 are disposed in the grooves 628a, 628b, respectively.

An end of the cover glass panel 618 is clamped between the grooves 628a, 628b and the leaf springs 630a, 630b. More specifically, a first glass frame 631a bent into a substantially channel shape is mounted on the end of the cover glass panel 618, and a hinge pin 633 is inserted between the first glass frame 631a and the side of the cover glass panel 618. One end of the hinge pin 633 projects by the length a from one side edge of the cover glass panel 618 into the groove 628a, and the projecting end of the hinge pin 633 is disposed between the groove 628a and the leaf spring 630a. The other end of the hinge pin 633 projects by the length b from the other side edge of the cover glass panel 618, and the projecting end of the hinge pin 633 is disposed between the groove 628b and the leaf spring 630b. A second glass frame 631b is mounted on the end of the cover glass panel 618 which is remote from the first glass frame 631a. The second glass frame 631b has an engaging ledge 637 projecting from its center, and two grips 635a, 635b disposed one on each side of the engaging ledge 637. The surface of the cover glass panel 618 for contacting an original is provided with a so-called AR coating for preventing reflection.

Figure 13:
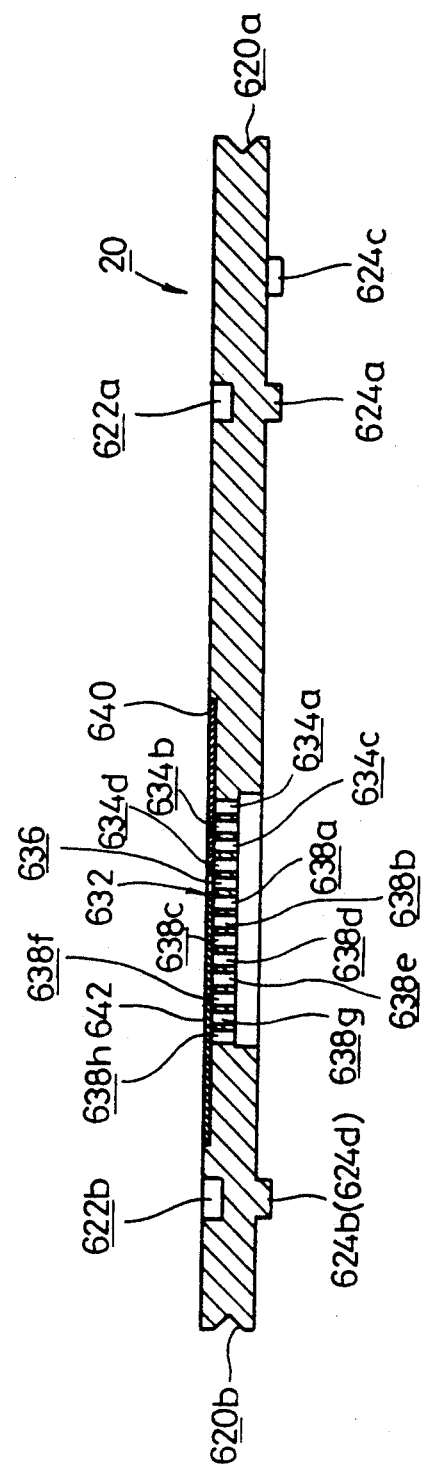
FIG. 13 is a cross-sectional view taken along line XIII—XIII of FIG. 11.

Between the recesses 622a, 622b, there is disposed a cassette identifying device 632 for identifying the number of the original cassette 610 and the type of the original S stored in the original cassette 20. The cassette identifying device 632 comprises, as shown in FIG. 13, bit holes 634a through 634d, 636, and 638a through 638h defined in the frame 612 and extending from the upper surface to the lower surface thereof, and labels 640, 642 applied to a label applying region 639 of the frame 612 where the bit holes 634a through 634d and 638a through 638h are defined. As shown in FIG. 14, the bit holes 634a through 634d and 638a through 638h are elongate in the direction indicated by the arrow A, and the bit hole 636 is circular and positioned centrally in the longitudinal direction of the bit holes 634a through 634d and 638a through 638h. The label applying region 639 is in the form of a cavity defined in the surface area 612c of the frame 612, and has an inclined edge 639a where the label 640 is applied and an inclined edge 639b where the label 642 is applied.

The label 640 is applied in the portion of the label applying region 639 where the bit holes 634a through 634d are defined. The label 640 is composed of an indicating portion 645 for indicating the type of the original S stored in the original cassette 20, and a setting portion 647 for setting the type of the original S. The indicating portion 645 indicates the size of the original S which is stored in the original cassette 20, and has a recess 645a in an end thereof corresponding to the inclined edge 639a of the label applying region 639. The setting portion 647 comprises a transparent light-intransmissive portion 644a and a nontransparent light-intransmissive portion 644b as a hole closing means. The bit holes 634a through 634d are selectively rendered transmissive portion 644a and the light-intransmissive portion 644b.

The label 642 is applied in the portion of the label applying region 639 where the bit holes 638a through 638h are defined. The label 642 is composed of an indicating portion 649 for indicating the number of the original cassette 20, and a setting portion 651 for setting the number of the original cassette 20. The indicating portion 649 indicates the number of the original cassette 20, and has a recess 649a in an end thereof corresponding to the inclined edge 639b of the label applying region 639. As with the setting portion 647 of the label 640, the setting portion 651 comprises a light-transmissive portion 653a and a light-intransmissive portion 653b which selectively render the bit holes 638a through 638h transmissive of light.

Figure 15:
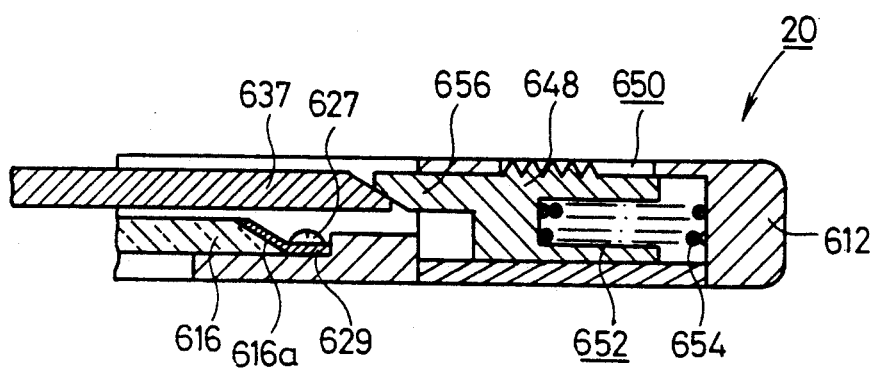
FIG. 15 is a cross-sectional view taken along line XV—XV of FIG. 11.

Between the recesses 622c, 622d, the frame 612 has relatively large holes 646a, 646b corresponding to the grips 635a, 635b of the second glass frame 631b mounted on the cover glass panel 618. A stopper 648 for engaging the engaging ledge 637 of the second glass frame 631b is mounted in the frame 612 between the holes 646a, 646b. More specifically, the frame 612 has a rectangular hole 650 defined therein between the holes 646a, 646b, and the stopper 648 is mounted in the hole 650 as shown in FIG. 15 (which is a cross-sectional view taken along line XV—XV of FIG. 11). The stopper 648 has a spring insertion hole 652 defined therein and extending in the direction in which the original cassette 20 is fed (i.e., in the direction indicated by the arrow A in FIG. 1). A compression coil spring 654 is inserted in the spring insertion hole 652 for press the stopper 648 toward the opening 614. The stopper 648 has a tooth 656 projecting toward the opening 614 for engaging the engaging ledge 637.

The image reading apparatus according to the present invention is basically constructed as described above. Now, operation of the image reading apparatus will be described below.

With the parts positioned as shown in FIG. 10, an original or subject S to be read is placed on the support glass panel 616, and thereafter the cover glass panel 618 is turned about the hinge pin 633 until the engaging ledge 637 of the second glass frame 631b is engaged by the tooth 656 of the stopper 648 (see FIG. 15).

The labels 640, 642 which indicate the type of the original S housed in the original cassette 20 and the number of the original cassette 20 are applied to the cassette identifying device 632 of the original cassette 20. The label 640 is applied such that the recess 645a is aligned with the inclined edge 639a of the label applying region 639 of the cassette identifying device 632. According to the label 640 shown in FIG. 14, for example, only the bit hole 634a is rendered transmissive of light by the light-transmissive portion 644a and the light-intransmissive portion 644b of the setting portion 647. The indicating portion 645 of the label 640 indicates the size (in this case, 4"×5") of the original S which corresponds to the code set in the setting portion 647. This indication allows the type of the original S stored in the original cassette 20 to be confirmed.

The label 642 is likewise applied such that the recess 649a is aligned with the inclined edge 639b of the label applying region 639 of the cassette identifying device 632. The bit holes 638a through 638g are rendered transmissive of light by the light-transmissive portion 653a of the setting portion 651 of the label 642, and the bit hole 638h is rendered intransmissive of light by the light-intransmissive portion 653b. The number of the original cassette 20 set in the setting portion 651 can be confirmed by the number (in this case, No. 1) indicated in the indicating portion 649.

The bit holes 634a through 634d and 638a through 638h defined in the cassette identifying device 632 are common to all original cassettes 20. When individual labels 640, 642 are applied to an original cassette 20, the original cassette 20 is made unique to the type of the original S stored therein and the number of the original cassette 20 itself. Therefore, original cassettes 20 can be massproduced inexpensively. Since the labels 640, 642 have respective recesses 645a, 649a corresponding to the inclined edges 639a, 639b of the label applying region 639, the labels 640, 642 will not be applied to the wrong areas.

The original cassette 2 with the desired original S stored therein is inserted into the cassette insertion slot 30 through the cassette loading/unloading region 14. The leading end of the original cassette 20 is gripped by the roller pair 120, and the cassette sensor 89 detects the original cassette 20, whereupon the feed mechanism 100 is actuated. The rotating drive source 114 is energized to rotate the pulley 116 to cause the timing belt 118 and the rotative power transmitting means 119 to rotate the roller pair 120, the first feed roller group 122, and the second feed roller group 124. The original cassette 20 with its frame 612 gripped by the roller pair 120 is fed toward the first feed roller group 122. When the leading end of the original cassette 20 passes by the identifying mechanism 90 and reaches the identifying mechanism driving sensor 91, the identifying mechanism 90 starts to identify the original cassette 20.

More specifically, when the cassette identifying device 632 of the original cassette 20 passes by the identifying mechanism 90, light emitted from the light-emitting diodes LED1 through LED13 of the light-emitting device 92 of the identifying mechanism 90 passes through the bit holes 634a through 634d, 636, 638a through 638h and is applied to the phototransistors PT1 through PT13 of the light-detecting device 94. In FIG. 14, for example, the light emitted from the light-emitting diode LED1 passes through the bit hole 634a and the light-transmissive portion 644a of the label 640, and reaches the phototransistor PT1 of the light-detecting device 94. The light emitted from the light-emitting diodes LED2 through LED4, however, does not reach the phototransistors PT2 through PT4 as it is blocked by the light-intransmissive portion 644b of the label 640. Therefore, the image reading apparatus 10 can identify the original S stored in the original cassette 20 as being of the size of 4"×5". Similarly, the light emitted from the light-emitting diodes LED6 through LED13 passes through the bit holes 638a through 638g and the light-transmissive portion 653a of the label 642, and reaches the phototransistors PT6 through PT12, whereupon the number of the original cassette 20 is confirmed as being No. 1.

Figure 16:
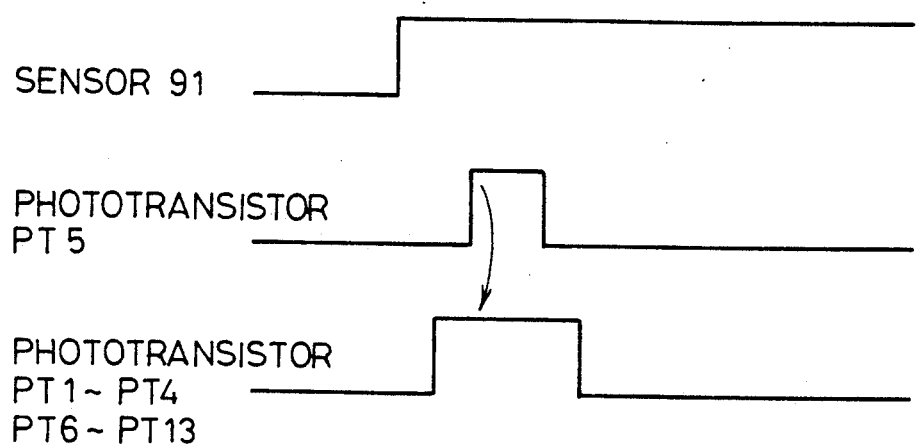
FIG. 16 is a timing chart of a cassette identifying process in the image reading apparatus.

The bit holes 634a through 634d and 638a through 638h defined in the cassette identifying device 632 are elongate in the direction in which the original cassette 20 is fed, and the bit hole 636 defined between the bit holes 634d, 638a is circular. When the light emitted from the light-emitting diode LED5 reaches the phototransistor PT5 through the bit hole 636, signals from the phototransistors PT1 through PT4 and PT6 through PT13 are latched for reliable confirmation of the type of the original S and the number of the original cassette 20 (see FIG. 16).

The feed rollers 132 of the first feed roller group 122 roll on the feed surface areas 612a, 612b of the frame 612, and the guide rollers 106, 110 are fitted in the V-shaped grooves 620a, 620b defined in the opposite sides of the frame 612, while the original cassette 20 is being fed to the second feed rollers 124.

The rods 108 on which the guide rollers 110 are supported are tilted toward the guide rollers 106 under the bias of the leaf springs 112. Upon insertion of the cassette 20 between the guide rollers 106, 110, the guide rollers 110 are turned outwardly against the resiliency of the leaf spring 112. Therefore, the cassette 20 is resiliently supported by the guide rollers 106, 110.

While being guided by the feed rollers 138 of the second feed roller group 124 and the guide rollers 230, 438 on the turntable 302, the leading end of the cassette 20 is brought into abutment against the stopper 418, whereupon the rotative drive source 114 is de-energized. The rods 426 supporting the guide rollers 430 are urged toward the turntable 302 by the coil springs 428, and the guide rollers 438 are urged toward the turntable 302 and the guide rollers 430 by the coil springs 432, 434. Therefore, the opposite sides of the cassette 20 are resiliently supported by the guide rollers 430, 438, and the frame 22 is pressed against the rotors 422a, 422b so that its vertical position with respect to the turntable 302 is adjusted.

Figure 7:
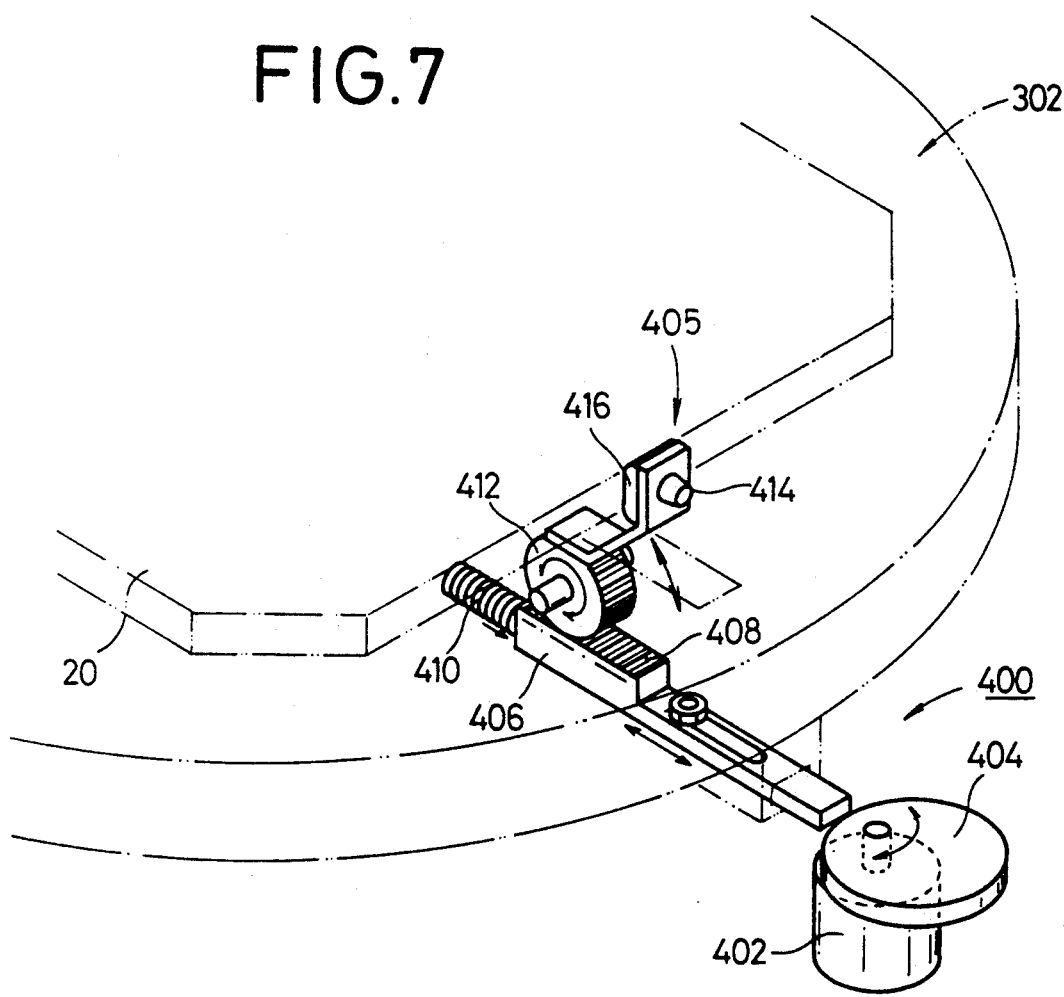
FIG. 7 is a positioning mechanism of the image reading apparatus.

Then, the rotative drive source 402 of the positioning mechanism 400 is energized to rotate the cam plate 404 through a certain angle until its smaller-diameter portion faces the slide member 406 of the lock means 405 (see FIG. 7). Consequently, the slide member 406 is displaced toward the cam plate 404 under the resilient force of the coil spring 410. The pinion 412 meshing with the rack 408 on the slide member 406 is rotated, thereby swinging the engaging pate 414 upwardly to press the resilient member 416 against the cassette 20.

After the cassette 20 has been positioned and held with respect to the turntable 302, the rotative drive source 142 of the displacing mechanism 140 is energized. The drive rod 146 is rotated through the gears 144, 148 to bring the cam members 150 on the opposite ends thereof into engagement with the blocks 156. Therefore, the slide plates 152 are lifted with respect to the frame 102 against the tension of the coil springs 154, thereby moving the second feed roller group 124 supported on the slide plates 152 away from the cassette 20 (see FIG. 17(a)).

Then, in order to adjust the angular position of the original S stored in the cassette 20, the rotative drive source 303 of the rotating mechanism 300 is energized, if necessary. The gears 306, 308 are rotated through the gear 304 coupled to the rotative drive source 303, and the turntable 302 combined with the gear 318 meshing with the gear 308 is rotated through a given angle while being guided by the support rollers 310a, 310b and 312a, 312b.

The trimming mechanism 250 is also actuated, if necessary, to trim the original S. More specifically, the rotative drive source 252 is energized to rotate the ball screw 254 to displace the trimming table 256, to which the nut 258 fitted over the ball screw 254 is secured, in a direction substantially normal to the auxiliary scanning direction i.e. transporting direction while being guided by the guide bars 260, so that the original S is mechanically trimmed.

In this embodiment, the original cassette 20 is firmly held on the turntable 302 by the lock means 405 and the guide means 425. Even when the turntable 302 is rotated and/or trimmed, the original cassette 20 is not positionally displaced. Since the lock means 405 is disposed on the turntable 302 and the rotative drive source 402 for actuating the lock means 405 is fixedly mounted on the trimming table 256, the turntable 302 can smoothly be rotated through a desired angle.

After the cassette 20 has been introduced into the housing 12, the engaging mechanism 50 is actuated in order to prevent a new cassette 20 from being introduced into the housing 12. More specifically, the linear solenoid 52 is energized to lower the rod 54 to cause the link 56 to turn the engaging member 58 against the tension of the tension spring 64. Therefore, the projecting portion 62 of the engaging member 58 enters one end of the cassette insertion slot 30, so that any new cassette 20 is prevented from being introduced through the cassette insertion slot 30.

After the cassette 20 has been positioned with respect to the original table 200, the rotative drive source 204 of the transporting scanning mechanism 202 is energized to rotate the ball screw 206 to feed the original table 200 along the guide bars 210 in the transporting scanning direction (indicated by the arrow A), and the light source 450 is turned on. Illuminating light L emitted from the light source 450 passes through the original S in the main scanning direction, thus detecting color image information carried by the original S as a light signal. The image information as the light signal is then applied through the focusing lenses 516, which have been positioned on the optical axis P by the rotative drive source 512, to the CCDs 530a through 530c. The color image information as the light signal is now photoelectrically read as R, G, B color signals by the CCDs 530a through 530c. During this time, the original table 200 is fed for auxiliary scanning in the direction indicated by the arrow A. The original S is two-dimensionally scanned with the illuminating light L, and its color image information is fully read by the CCDs 530a through 530c.

After the original S has been read, the rotative drive source 204 of the auxiliary scanning mechanism 202 is energized to move the original table 200 in a direction opposite to the direction indicated by the arrow A, and thereafter the trimming mechanism 250 and the rotating mechanism 300 are driven, if necessary, to position the turntable 302 in the position for loading and unloading the cassette 20. The rotative drive source 142 of the displacing mechanism 140 is energized to lower the slide plates 152 until the feed rollers 138 of the second feed roller group 124 abut against the feed surface areas 612a, 612b of the frame 612 of the original cassette 20 (see FIG. 17(b)). Moreover, the rotative drive source 402 of the positioning mechanism 400 is energized to rotate the cam plate 404 for bringing its larger-diameter portion into engagement with the slide member 406. The slide member 406 is therefore displaced against the bias of the coil spring 410, enabling the rack 408 and the pinion 412 to displace the engaging plate 414 away from the original cassette 20 into the turntable 302.

The rotative drive source 114 of the feed mechanism 100 is energized to rotate the pulley 116 in a direction opposite to the previous direction. The second feed roller group 124, the first feed roller group 122, and the roller pair 120 are driven by the timing belt 118 and the rotative power transmitting means 119 for thereby discharging the cassette 20 out of the cassette loading/unloading region 14. At this time, the linear solenoid 52 of the engaging mechanism 50 has been de-energized, allowing the engaging member 58 to be displaced under the tension of the tension spring 64. Since the projecting portion 62 has thus been displaced out of the cassette insertion slot 30, the cassette 20 can be removed out of the cassette insertion slot 30.

In the above embodiment, the cassette 20 inserted into the housing 12 through the cassette loading/unloading region 14 is automatically fed to the turntable 302 by the feed mechanism 100, and thereafter positioned and held on the turntable 302 by the positioning mechanism 400. Then, while the original table 200 is being fed in the auxiliary scanning direction, the light source 450 is energized to read the color image information carried by the original S. Thereafter, the cassette 20 is automatically fed to the cassette loading/unloading region 14 by the feed mechanism 100. Therefore, the conventional process, which the operator is required to do, for loading the cassette on and unloading the cassette from the turntable is not necessary. The cassette loading and unloading operation is thus rendered efficient, and the entire reading operation can easily automatized.

Furthermore, the original cassette 20 is fed with respect to the original table 200 by the feed mechanism 100. When the original cassette 20 is positioned in place on the turntable 302, the feed rollers 138 of the second feed roller group 124 are held in rolling contact with the original cassette 20. If the rotating mechanism 300, the trimming mechanism 250, and the auxiliary scanning mechanism 202 were actuated under this condition, the turntable 302 would be obstructed by the second feed roller group 124 against smooth displacement in any desired direction However, since the second feed roller group 124 is actually displaced away from the original cassette 20 by the displacement mechanism 140 on the feed mechanism 100 (see FIG. 17(a)), the turntable 302 can smoothly and accurately be rotated, trimmed, or displaced in the auxiliary scanning direction.

Figure 17B:
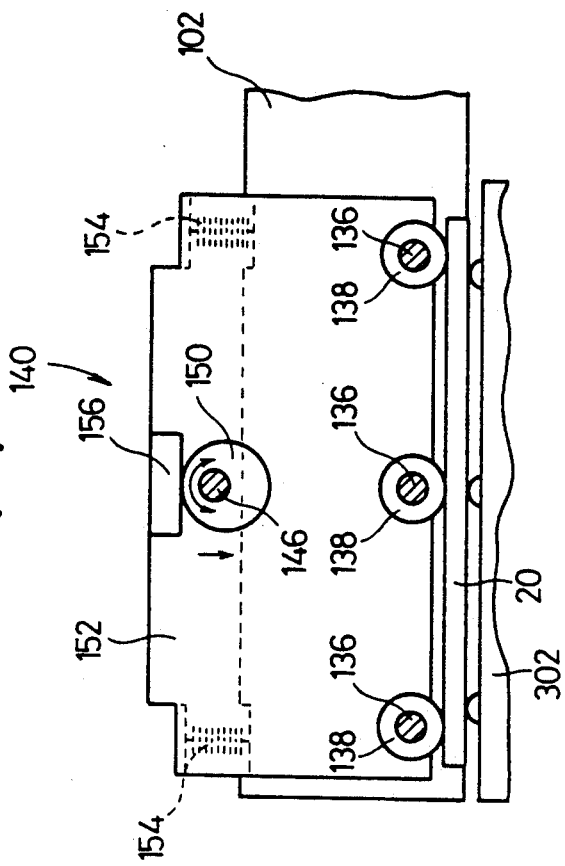
FIGS. 17(a) and 17(b) are views illustrative of the manner in which the displacing mechanism operates.
Figure 17A:
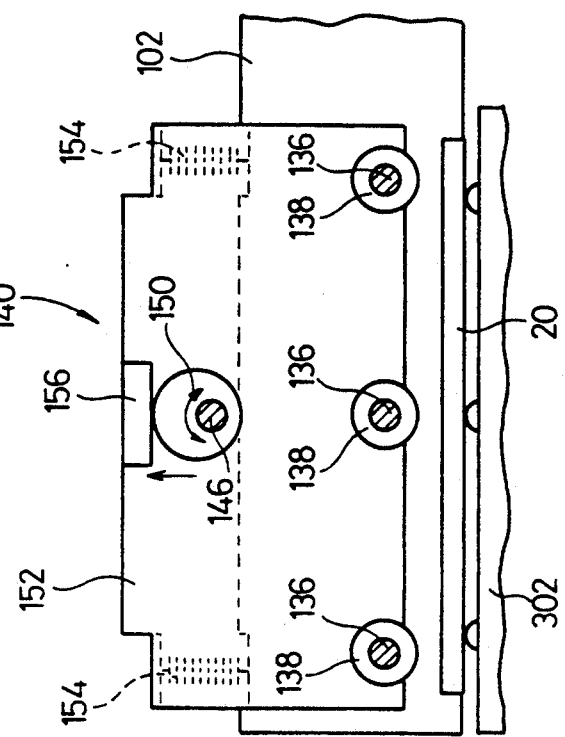

After the image information borne by the original S has been read, the second feed roller group 124 is brought into rolling engagement with the original cassette 20 by the displacing mechanism 140 (see FIG. 17(b)). Upon rotation of the feed rollers 138, the original cassette 20 is moved toward the first feed roller group 122, and hence can quickly be fed toward the cassette loading/unloading region 14.

The original S is read once to establish image processing conditions with which the image information recorded on the original S will be read, and thereafter the original cassette 20 is returned to the cassette insertion slot 30. Thereafter, the original cassette 20 is introduced again for reading the original S under the image processing conditions which have been established. In such a mode of operation, the data read from the cassette identifying device 632 and indicative of the type of the original S and the number of the original cassette 20 are highly effective.

More specifically, since the image reading apparatus 10 recognizes the type of the original S with the label 640 in the cassette identifying device 632. Therefore, the positional relation of the CCDs 530a through 530c to the original S at the time of establishing image processing conditions can appropriately be established according to the recognized type. Because the number of the original cassette 20 is recognized with the label 642, no other original cassette will be introduced in error when that original cassette 20 is to be introduced again.

The means for setting the type of the original S or the means for setting the number of the original cassette 20 may comprise pins molded of resin which will be fitted into selected ones of the bit holes 634a through 634d, 638a through 638h, rather than the setting portions 647, 651 of the labels 640, 642.

Figure 18:
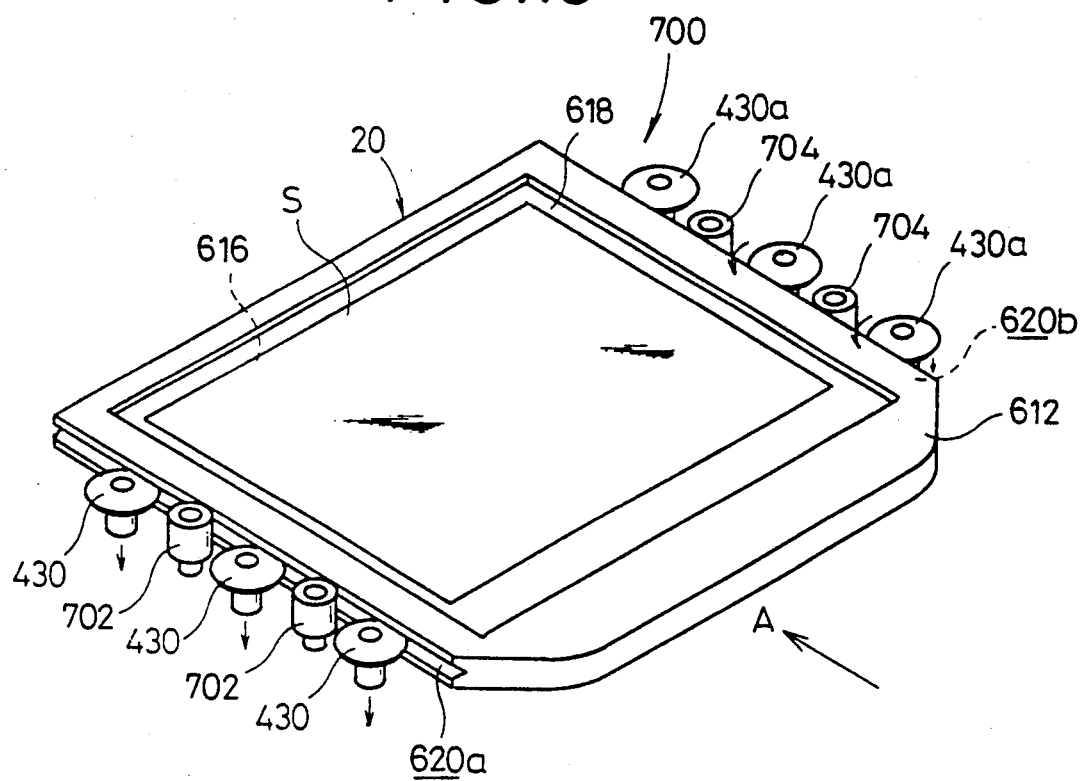
FIG. 18 is a perspective view of a guide means according to another embodiment in the positioning mechanism.

FIG. 18 shows a guide means according to another embodiment in the positioning mechanism 400. Those parts shown in FIG. 18 which are identical to those of the guide means 425 according to the first embodiment are denoted at identical reference numerals, and will not be described in detail.

A guide mean 700 according to the second embodiment shown in FIG. 18 has a plurality of column members 702 each rotatably disposed between adjacent two of guide rollers 430, and a plurality of column members 704 each rotatably disposed between adjacent two of guide rollers 430a. The guide rollers 430, 430a are vertically movable with respect to a turntable 302. The column members 704 are swingable through resilient members (not shown) with respect to the column members 702 which are fixed against swinging movement.

When the guide rollers 430, 430a engage in the V-shaped grooves 620a, 620b of the original cassette 20, the original cassette 20 is pressed against the turntable 302, and the swingable column members 704 press the original cassette 20 against the column member 702. Therefore, the guide means 700 operates in the same manner as the guide means 425 according to the previous embodiment.

The guide rollers 430a and the swingable column members 704 may be replaced with the vertically movable and swingable guide rollers 438. Such a modified guide means also operates in the same manner as the guide means 425.

With the present invention, as described above, after the cassette storing the original to be read has been automatically fed to the turntable by the feed mechanism, the cassette is rotated and trimmed, if necessary, and then is fed in the auxiliary scanning direction by the auxiliary scanning mechanism. Therefore, the original can automatically be read. Since the feed mechanism is employed to automatically feed the cassette to the turntable, the entire reading operation can easily by automatized.

Furthermore, the original cassette storing the original is firmly positioned and held on the turntable by the lock means, so that the original cassette is prevented from being positionally displaced when the turntable operates as desired.

Since the original cassette is positioned along the optical axis at least with respect to the turntable by the guide means, the original stored in the original cassette can automatically be placed in a desired angular position with high accuracy.

Still more, after the original cassette with the original contained therein has been fed to a predetermined position on the original table, the feed rollers held in rolling contact with the original cassette are spaced away from the original cassette by the displacing mechanism. Therefore, the original cassette can smoothly be fed in a desired direction, e.g., the auxiliary scanning direction. Consequently, the original cassette can automatically fed toward the original table.

Moreover, data indicative of the type of an original or the number of an original cassette are set when a plurality of holes defined in the original cassette are selectively rendered intransmissive of light by hole closing means. Therefore, original cassettes before any hole closing means is mounted are commonly used, and hence are available inexpensively. Since an original or an original cassette can be identified by a transmissive light sensor used in combination with the holes in the original cassette, necessary information can be detected more accurately and with a simpler arrangement than possible with a reflective light sensor.

Although certain preferred embodiments have been shown and described, it should be understood that many changes and modifications may be made therein without departing form the scope of the appended claims.

What is claimed is:

1. An image reading apparatus which receives an original cassette which stores an original to be read, said original being irradiated with illuminating light from an elongated light source and being read line-by-line by an array of light detecting elements disposed in a main scanning direction while said original is being scanned in an auxiliary scanning direction, said auxiliary scanning direction being perpendicular to said main scanning direction, said image reading apparatus comprising:

a housing having a cassette insertion slot;
an original table positioned in said housing for receiving and supporting the original cassette inserted through said cassette insertion slot;
an auxiliary scanning mechanism attached to said original table for transporting the original cassette held on said original table in the auxiliary scanning direction;
a trimming mechanism provided on said original table for transferring an unnecessary peripheral portion of the original out of sight by moving said original cassette held on said original table in a trimming direction along the main scanning direction;
a rotating mechanism comprising a turntable mounted on said trimming mechanism for adjusting the angular position of the original cassette with respect to said trimming mechanism to a desired reading position;
a positioning mechanism for positioning and fixing the original cassette at a predetermined position on said turntable where the original cassette is held perpendicular to an optical axis of the illuminating light, said positioning mechanism comprising guide means for guiding the original cassette to said predetermined position when said turntable is placed at an angular position where the original cassette can be installed on and removed from said turntable, lock means for locking the original cassette at said predetermined position, and an actuator for actuating said lock means to lock and release the original cassette; and
a feed mechanism for automatically feeding the original cassette from said cassette insertion slot to said original table.

2. An image reading apparatus according to claim 13, wherein said feed mechanism comprises a plurality of feed rollers rotatably contacting said original cassette for feeding the original cassette to said original table, and means for displacing said feed rollers out of engagement with the original cassette when the original cassette is placed at least in a predetermined position on said original table.

3. An image reading apparatus according to claim 2, wherein said displacing means comprises a slide plate, said feed rollers being supported on said slide plate, a resilient member for pulling said slide plate toward said original cassette, and a rotatable cam member engaging said slide plate.

4. An image reading apparatus according to claim 1, wherein said rotating mechanism comprises a rotatable drive gear, a ring rear mounted on said turntable and held in mesh with said drive gear, a groove defined in an outer circumferential surface of said turntable, and a plurality of support rollers held in contact with said groove a supporting said turntable.

5. An image reading apparatus according to claim 4, wherein said groove of the turntable has a V-shaped cross section, each of said support rollers having an outer circumferential surface having an arcuate cross section and being held in point-to-point contact with said groove having said V-shaped cross section.

6. An image reading apparatus according to claim 1, wherein said trimming mechanism comprises a trimming table, said turntable being supported on said trimming table, and a screw for moving said trimming table in the trimming direction.

7. An image reading apparatus according to claim 1, wherein said original cassette has a pair of grooves each having a V-shaped cross section defined on first and second sides of said original cassette, said feed mechanism comprising a plurality of feed rollers each engageable with said original cassette, for feeding the original cassette, and a plurality of guide rollers each having an outer circumferential surface having an arcuate cross section and held in point-to-point contact with each of said grooves, for supporting said original cassette.

8. An image reading apparatus according to claim 7, wherein said guide means comprises a plurality of guide rollers for guiding the original cassette by being held in contact with said grooves on said first and second sides of said original cassette along a direction in which the original cassette is fed, and a resilient member for resiliently pulling said original cassette along the optical axis through said guide rollers.

9. An image reading apparatus according to claim 1, further including an identifying mechanism having a light-emitting device and a light-detecting device, said original cassette comprising a frame surrounding the original, said frame having a plurality of holes extending from one surface to another surface of said frame, for allowing light emitted from said light-emitting device to be applied to said light-detecting device, said original cassette further comprising hole closing means for making selected ones of said holes intransmissive of light.

10. An image reading apparatus according to claim 9, wherein said hole closing means comprises a light-intransmissive portion of light-transmissive label, which corresponds to said selected holes.

11. An image reading apparatus according to claim 1, wherein said lock means comprises a stopper for engaging one end of said original cassette, and an engaging plate swingably supported by a spring and engageable with an opposite end of said original cassette.

12. An image reading apparatus according to claim 1, wherein said actuator comprises a rotatable cam plate, and a slide member displaceable into engagement with said lock means when pushed by said cam plate.

13. An image reading apparatus according to claim 1, wherein said original table is movable in the auxiliary scanning direction or in the trimming direction, or rotated to adjust an angle at which said original is to be read.

14. An image reading apparatus comprising:
an original cassette which stores an original to be read;
an original table for supporting said original cassette;
a transporting mechanism for feeding said original cassette, with said original table, in a transporting direction substantially normal to a main scanning direction of an illuminating light source;
a rotating mechanism mounted on said original table and having a turntable for holding said original cassette;
a positioning mechanism for positioning and fixing the original cassette with respect to said turntable;
a trimming mechanism for moving said turntable in the main scanning direction of the illuminating light source, said main scanning direction being a trimming direction in which said turntable can be trimmed;
a feed mechanism for automatically feeding said original cassette from a cassette insertion slot to said turntable; and
an identifying mechanism having a light-emitting device and a light-detecting device;
wherein said original cassette comprises a frame surrounding the original, said frame having a plurality of holes extending from one surface to another surface of said frame for allowing light emitted from said light-emitting device to be applied to said light-detecting device, said original cassette further comprises hole closing means for making selected one of said holes intransmissive of light.

15. An image reading apparatus according to claim 14, wherein said hole closing means comprises a light-intransmissive portion of a light-transmissive label, which corresponds to said selected holes.

* * * * *